United States Patent [19]

Noestheden

[11] Patent Number: 5,411,130

[45] Date of Patent: May 2, 1995

[54] CONVEYOR SYSTEM WITH TURN TABLE TRANSFERRING MEANS

[75] Inventor: Andrew Noestheden, Tecumseh, Canada

[73] Assignee: Valiant Machine & Tool, Inc., Windsor, Canada

[21] Appl. No.: 197,725

[22] Filed: Feb. 17, 1994

[51] Int. Cl.6 ............................................. B65G 47/26
[52] U.S. Cl. ................................. 198/457; 198/465.2; 198/780
[58] Field of Search ............... 198/465.1, 465.2, 465.4, 198/457, 801, 780, 781

[56] References Cited

U.S. PATENT DOCUMENTS

| | | | |
|---|---|---|---|
| 3,530,571 | 9/1970 | Perry | 198/465.2 |
| 3,646,656 | 3/1972 | Zilhay et al. | 198/465.2 X |
| 4,291,797 | 9/1981 | Ewertowski | 198/465.1 X |
| 4,338,864 | 7/1982 | Ziegenfus | 198/465.1 X |
| 4,492,297 | 1/1985 | Sticht | 198/465.1 |
| 4,515,264 | 5/1985 | Sticht | 198/465.2 X |
| 4,598,816 | 7/1986 | Kutzli et al. | 198/465.1 |
| 4,762,218 | 8/1988 | Sticht | 198/465.2 X |
| 4,832,170 | 5/1989 | Takeuchi et al. | 198/465.1 X |
| 5,103,963 | 4/1992 | Sticht | 198/465.1 |

Primary Examiner—D. Glenn Dayoan
Attorney, Agent, or Firm—Gifford, Krass, Groh, Sprinkle, Patmore, Anderson & Citkowski

[57] ABSTRACT

A conveyor system having a frame with a first and second elongated rail which are spaced apart and parallel to each other. A plurality of first power and free rollers are rotatably mounted to the first rail while, similarly, a plurality of power and free rollers are rotatably mounted to the second rail so that the first rollers define a first conveyor line while the second rollers define a second conveyor line. At least one pallet which supports a work piece has a lower surface which is adapted to be supported and propelled by even the first or second rollers along the first or second conveyor line. A turn table is provided at one end of the first and second conveyor lines for transferring the pallet from the first conveyor line to the second conveyor line. The turn table includes at least one conveyor line section and a motor for rotating the turn table between the first position in which the conveyor line section is in line with the first conveyor line, and the second position is which the conveyor line section is in line with the second conveyor line.

12 Claims, 4 Drawing Sheets

CONVEYOR SYSTEM WITH TURN TABLE TRANSFERRING MEANS

BACKGROUND OF THE INVENTION

I. Field of the Invention

The present invention relates generally to conveyor systems and, more particularly to a conveyor system with a turn table for transferring pallets from a first conveyor line to a second conveyor line.

II. Description of the Prior Art

Many assembly lines, for example assembly lines of the type used in automotive industries, utilize conveyor lines for transferring the part being assembled from one work station to the next. Furthermore, many of these previously known conveyor lines include a plurality of power and free rollers which are spaced apart from each other and define a conveyor line. Pallets carrying the part being assembled are then supported and propelled by the power and free rollers.

Typically, the conveyor line for these previously known conveyor systems comprise a pair of spaced apart and elongated rails having the power and free rollers rotatably mounted between the rails. A work piece carrying pallets then have a lower surface which sits upon the power and free rollers.

It would be desirable for such conveyor systems to have a single elongated conveyor line with the assembly of the part beginning at one end of the line and the finished product exiting off the opposite end of the line. However, in most cases such a conveyor line is impractical due to factory floor space limitations. Instead, as a practical matter, the assembly line is divided into a number of shorter sections with the pallet being transferred from one conveyor section to the next conveyor section as the assembly of the part progresses.

In order to transfer the part from one conveyor section to the next conveyor section, it has been the previously known practice to utilize transfer or cross conveyor sections between the end of one conveyor section and the next adjacent conveyor section which typically is spaced from but parallel to the first line. This practice, however, has disadvantages for a number of reasons.

One disadvantage of these previously known systems is that the transverse conveyor lines for transferring the pallet from one conveyor line to the next sequential conveyor line must, of course, be of a length sufficient to accommodate the pallet. Consequently, a space is created between the two sequential conveyor lines equal to the length of the transverse conveyor lines and the space is essentially wasted. Factory floor space, of course, is not only limited but also expensive.

The lateral space in between the sequential and adjacent conveyor lines employed by these previously known systems is also disadvantageous since it necessarily requires that each conveyor line be supplied with its own power supply system, pressurized air and the like. This increases the overall cost of the conveyor system.

A still further disadvantage of these previously known conveyor systems is that the parts have traditionally been supported on top of the pallets and, thus, on top of the conveyor line. Such a pallet construction often times requires awkward and elevated hand movements for the worker. Such awkward and elevated hand movements for the worker results in worker fatigue and poorly assembled parts.

SUMMARY OF THE PRESENT INVENTION

The present invention provides a conveyor system for use on an assembly line which overcomes all of the above mentioned disadvantages of the previously known devices.

In brief, the conveyor system of the present invention includes a frame having a first a and second elongated rail which are spaced apart from each other. A plurality of first rollers are rotatably mounted to the first rail at longitudinally spaced positions therealong so that the first rollers define a first conveyor line. Similarly, a plurality of second rollers are rotatably mounted to the second rail at longitudinally spaced positions therealong so that the second rollers define a second conveyor line. Consequently, the conveyor lines run parallel to each other and are closely adjacent to each other.

At least some of the rollers in each conveyor line are power and free rollers, i.e. rollers which are normally rotatably driven by a drive axle but which can be held stationary while permitting the continued rotation of its drive axle.

At least one, and preferably a plurality of pallets are provided where each pallet includes means for carrying the work piece or part under assembly. Each pallet further includes a lower surface which is supported by and propelled by the power and free rollers on the first and second conveyor lines.

Unlike the previously known work piece carrying pallets, however, the work piece carrying pallets of the present invention comprises a generally upright member having at least one guide roller mounted to its upper end. This guide roller cooperates with a guide rail mounted to the conveyor frame to prevent tilting of the upright member. The work piece under assembly, in turn, is secured to a work piece supporting assembly which extends laterally outwardly from the pallet upright member. In doing so, the work piece is positioned not only laterally outwardly from the conveyor rollers, but can also be positioned at a relatively low position to facilitate assembly by the workers.

In order to transfer the pallets from the first conveyor line to the second conveyor line, a turn table is provided at one end of the first and second conveyor line. The turn table includes at least one conveyor section which is defined by a plurality of spaced rollers. A motor is utilized to rotate the turn table about a vertical axis between a first position, in which the conveyor section is in line with the first conveyor line, and a second position in which the conveyor section is in line with the second conveyor line.

Thus, in practice, the conveyor section on the turn table receives the pallets from the first conveyor line. Once the pallet is positioned on the turn table, the motor is activated to rotate the turn table 180°. In doing so, the conveyor section is aligned with the second conveyor line and the pallet is transferred onto the second conveyor line in the desired fashion.

BRIEF DESCRIPTION OF THE DRAWING

A better understanding of the present invention will be had upon reference to the following detailed description, when read in conjunction with the accompany drawing, wherein like reference characters refer to like parts throughout the several views, and in which.

DETAILED DESCRIPTION OF A PREFERRED EMBODIMENT OF THE PRESENT INVENTION

Figure 1:
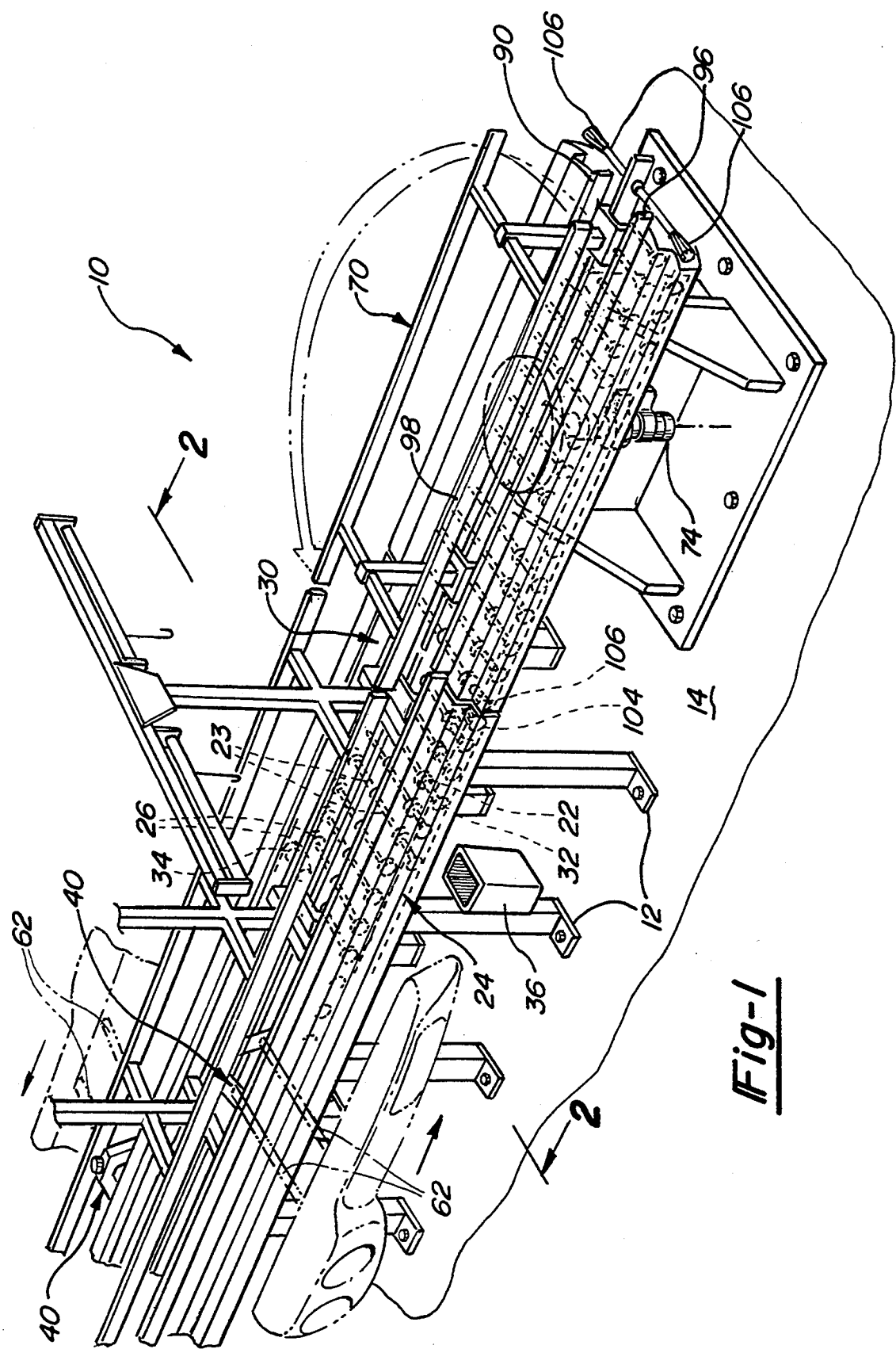
FIG. 1 is a fragmentary elevational view illustrating a preferred embodiment of the present invention.
Figure 2:
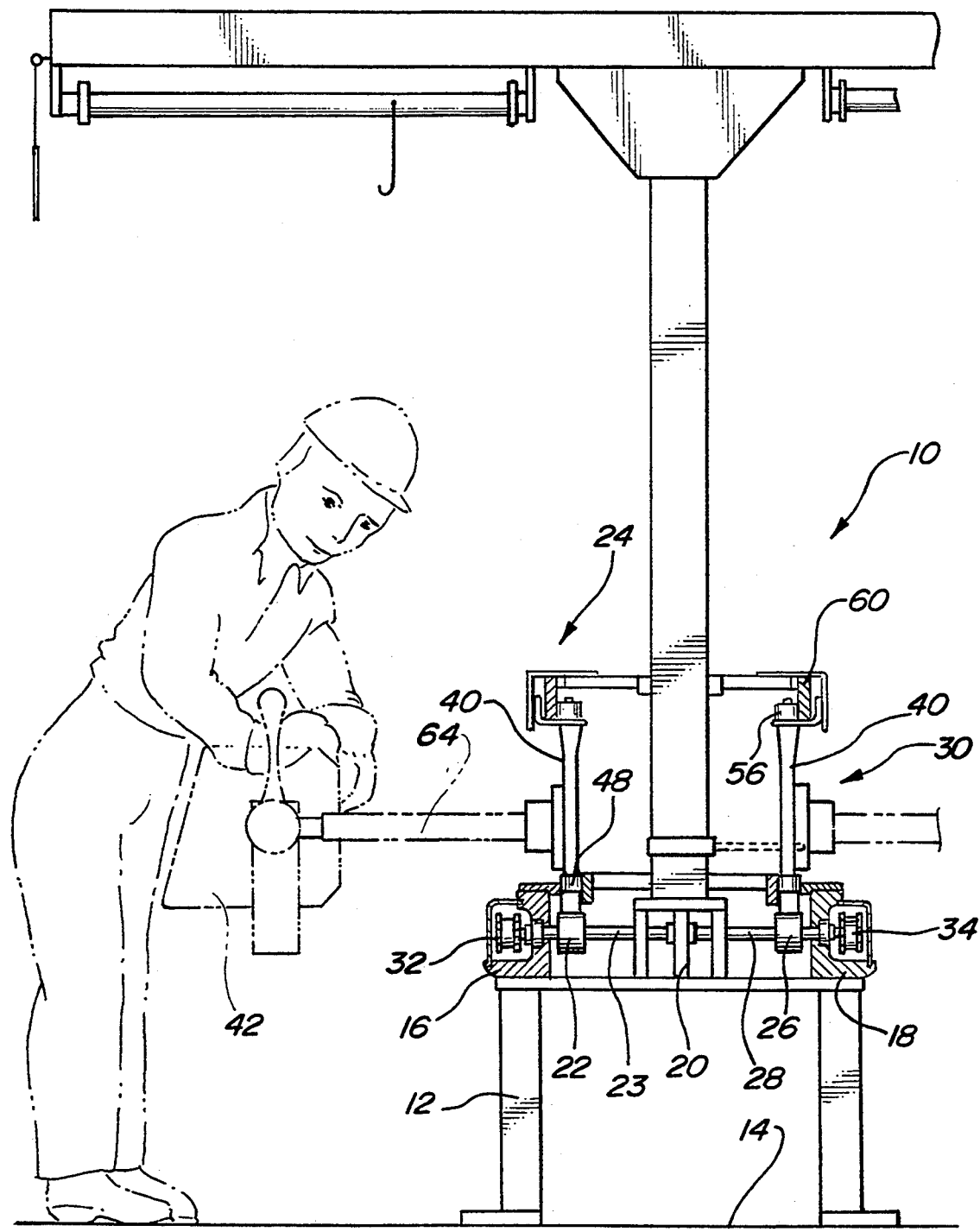
FIG. 2 is a sectional view taken substantially along line 2—2 in FIG. 1.

With reference first to FIGS. 1 and 2, a preferred embodiment of the conveyor system 10 of the present invention is there shown and comprises a frame 12 which supports the conveyor system on the ground support surface 14. A first elongated rail 16 is secured to and supported by the frame 12 while, similarly, a second elongated rail 18 is also secured to and supported by the frame 12. The rails 16 and 18 are spaced apart and generally parallel to each other. A center rail 20 (FIG. 2) is also supported by the frame 12 at a position intermediate the rails 16 and 18.

A plurality of longitudinally spaced first rollers 22 are rotatably mounted on axles 23 between the first rail 16 and the central rail 20 at longitudinal spaces therealong. In doing so, the first rollers 22 define a first conveyor line 24.

Similarly, a plurality of second rollers 26 are rotatably mounted by axle 28 between the second rail 18 and the central rail 20 at space positions therealong. Consequently, the second rollers 26 define a second conveyor line 30 which is parallel to and closely adjacent the first conveyor line 24.

Drive sprockets 32 and 34 are respectively drivingly connected to the roller axle 23 and 28. The drive sprockets 32 and 34 are rotatably driven by conventional means 36 (FIG. 1), illustrated only diagrammatically, in any conventional fashion.

The rollers 22 and 26 are power and free rollers. As such the axle 23 and 28 respectively rotatably drive the rollers 22 and 26 as the axis 23 and 26 are rotatably driven by the drive means 36 via the drive sprockets 32. However, the rollers 22 and 26 can be held stationary despite continued rotation of their respective axis 23 and 28 whenever the torque on the rollers 22 or 26 exceeds a predetermined amount. As is well known, this provision allows the parts transported by the conveyor lines 24 and 30 to accumulate along the conveyor lines.

Figure 3:
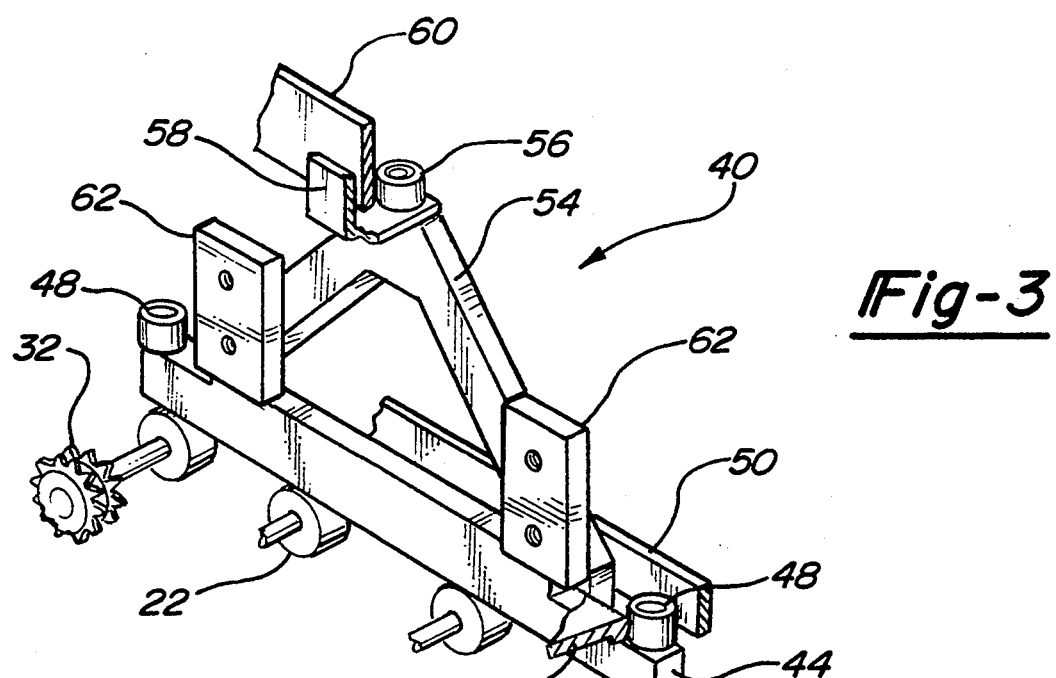
FIG. 3 is a fragmentary elevational view illustrating a preferred embodiment of the pallet assembly of the present invention.

With reference now to FIGS. 2 and 3, at least one, and preferably a plurality, of pallets 40 are provided for transferring work pieces 42 (FIG. 2) under assembly along the conveyor lines 24 and 30. As best shown in FIG. 3, the pallet 30 includes an elongated lower runner 44 having a lower surface 46 adapted to the supported by and propelled by the rollers 22 on the conveyor line 24 or, alternatively, the rollers 26 on the second conveyor line 30. Preferably, the runner 44 has a length such that the runner overlies at least three of the rollers 22.

In order to insure that the runner 44 remains centered over the rollers 22, a lower guide roller 48 is provided at each end of the runner 44. Each guide roller 48 is rotatably mounted about a vertical axis and is sandwiched in between two guide rails 50 and 52 secured to the frame 12.

Still referring to FIG. 3, the pallet assembly 40 includes an upright member 54 having an upper guide roller 56 mounted at its top. This upper guide roller 56, together with a retainer flange 58, cooperates with an upper guide rail 60 mounted to the frame 12 to maintain the upright member 54 in a vertical position and to prevent lateral wobbling or displacement of the pallet assembly 40.

Referring now to both FIGS. 2 and 3, a pair of spaced retainer plates 62 are also mounted to the upright member 54 while a work piece support member 64 (FIG. 2) has one end secured to the plates 62 and the work piece 42 under assembly secured to the other end of the support member 64. Furthermore, as best shown in FIG. 2, the work piece support member 64 extends laterally outwardly from the upright member 54 so that the work piece 42 can be positioned both at a position spaced laterally outwardly from the conveyor lines 24 and 30, and also at a relatively low position with respect to the conveyor lines 24 and 30.

Figure 4:
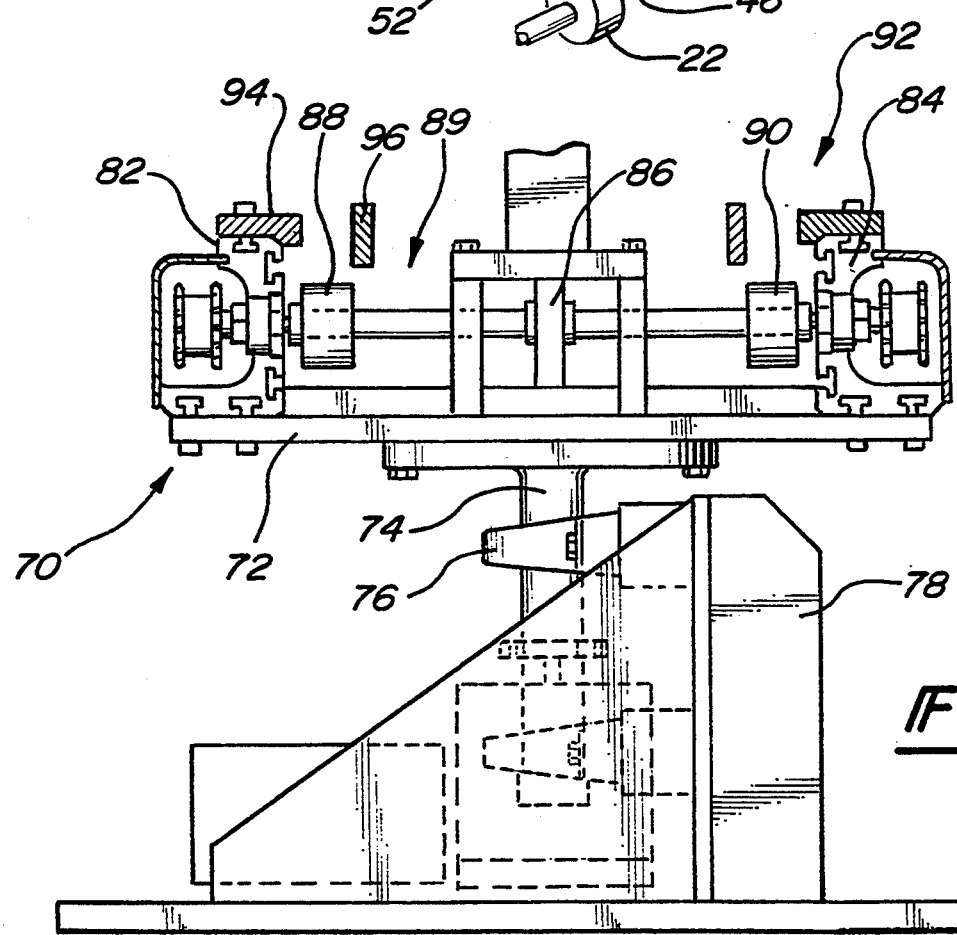
FIG. 4 is a fragmentary end view of the turn table assembly.
Figure 5:
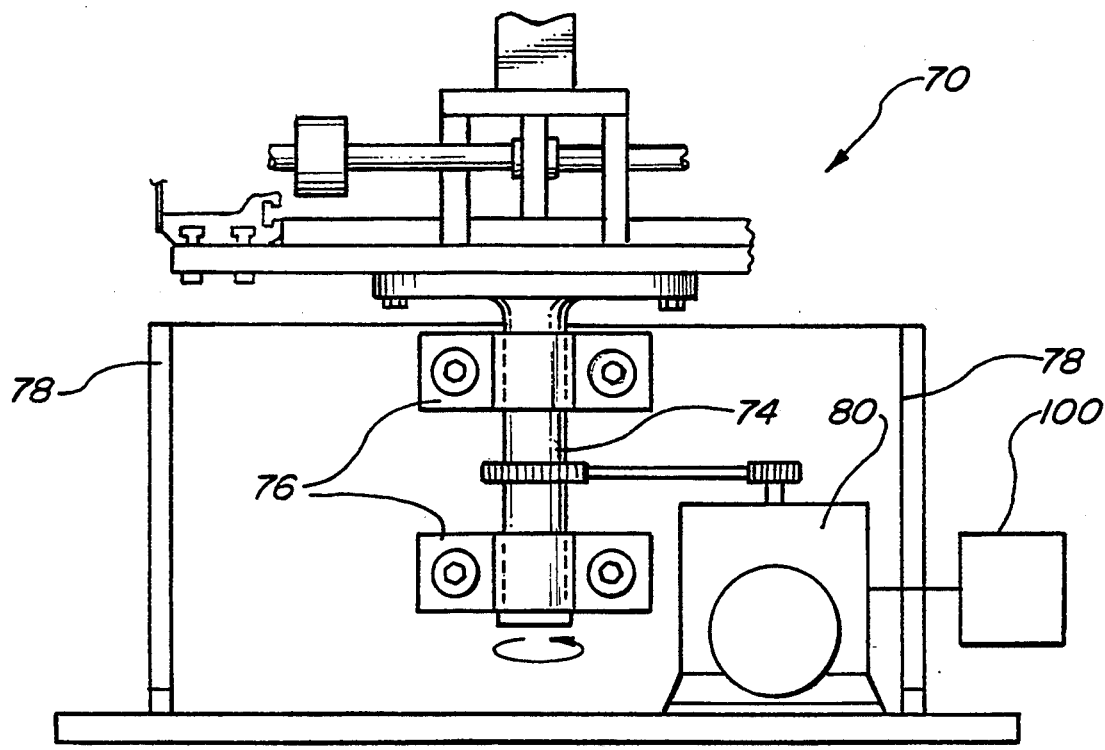
FIG. 5 is a side view of the turn table assembly.

With reference now to FIGS. 1, 4 and 5, a turn table assembly 70 is provided at one end of the conveyor lines 24 and 30 for transferring the pallet 40 from the first conveyor line 24 to the second conveyor line 30. The turn table assembly 70 comprises a turn table support plate 72 having a downwardly vertically extending axle 74 at its center. This axle 74, in turn, is rotatably mounted above the vertical axis by bearing assembly 76 to a turn table base support 78. A motor 80 is drivenly connected to the axle 74 which, upon activation, rotates the shaft 74 with its attached support plate 72.

With reference now to FIGS. 1 and 4, like the conveyor lines 24 and 30, the turn table assembly 70 includes a pair of spaced apart and parallel rails 82 and 84 with a central rail 86 positioned intermediate the rails 82 and 84.

A plurality of longitudinally spaced power and free rollers 88 form a first conveyor section along the turn table assembly 70 while, similarly, a plurality of longitudinally spaced power and free rollers 90 form a second conveyor section 92 which is parallel to and adjacent the first conveyor section 89.

Like the conveyor illustrated in FIG. 2, the turn table includes lower guide rails 94 and 96 corresponding to the guide rails 52 and 50 and an upper guide rail 98 (FIG. 1) which corresponds with the upper guide rail 60 (FIG. 2) on the conveyor lines 24 and 30. Consequently, the conveyor sections 89 and 92 on the turn table assembly 70 essentially duplicate the construction of the conveyor lines 24 and 30 except, of course, that the turn table assembly 70 is rotatable about its axle 74.

With the turn table of 70 in the position illustrated in FIG. 1, the conveyor section 89 is aligned with the conveyor line 24 and, simultaneously, the conveyor section 92 is aligned with conveyor line 30. Activation of the turn table motor 80 by a control system 100 (FIG. 5) rotates the turn table plate 70 one hundred and eighty degrees (180°). In doing so, the alignment of the conveyor sections 89 and 92 with respect to the conveyor lines 24 and 30 is reversed, i.e. the conveyor section 89 is aligned with the conveyor line 30 and the conveyor section 92 is aligned with the conveyor section 24. The alignment of the conveyor lines 89 and 92 with respect to the conveyor lines 24 and 30 is again reversed when the turn table is subsequently activated to rotate again one hundred and eighty degrees (180°).

Figure 6:
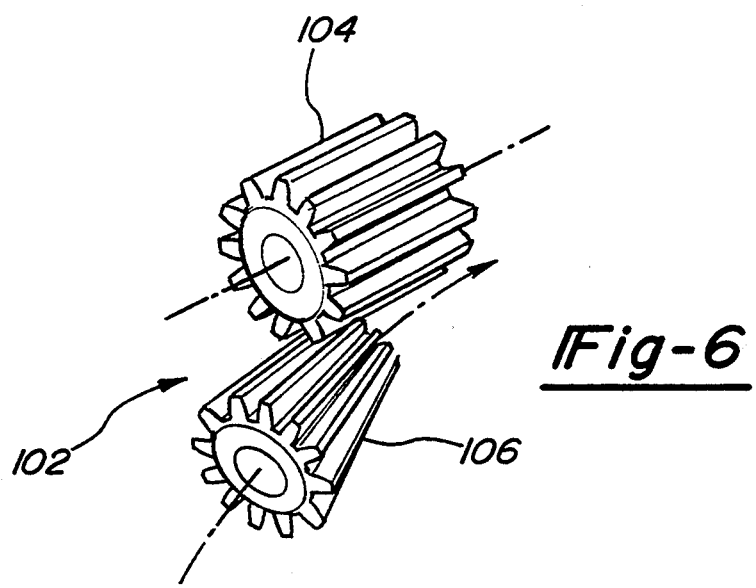
FIG. 6 is a fragmentary view illustrating the transmission means for transmitting power between the conveyor lines and the turn table.

Preferably the motor means 36 (FIG. 1) is also employed to rotatably drive the rollers 88 and 90 on the turn table assembly 70. In order to accomplish this, a transmission assembly 102 best shown in FIG. 6, is provided between the conveyor lines 24 and 30 and the turn table assembly 70. The transmission assembly 102 comprises a pinion 104 rotatably mounted to each conveyor line 24 and 30 adjacent its end next to the turn table assembly 70. These pinions 104 are continuously driven by the motor means 36.

The transmission assembly 102 also includes a pinion 106 mounted adjacent each end of each conveyor section 89 and 92 so that four pinions 106, altogether, are mounted to the turn table assembly 70. Furthermore, these pinions 106 are designed so that, with the turn table assembly 70 in the position illustrated in FIG. 1, one pinion 104 at the end of the conveyor line 24 meshes with a corresponding pinion 106 while, similarly, one pinion 104 at the end of the conveyor line 30 meshes with a second pinion 106. Conversely, with the turn table assembly rotated 180° from the position shown in FIG. 1, the other two pinions 106 will mesh with the pinions 104.

The pinions 106 are drivenly connected with the rollers 88 or 90 on their associate conveyor line 89 or 92. Thus with the turn table assembly 70 in the position shown in FIG. 1, the motor means 36 drives the rollers 88 and 90 on the turn table assembly 70 via the transmission assembly 102. Conversely, during rotation of the turn table assembly 70 between its first position and second positions, i.e. between the positions in which the conveyor sections 89 and 92 are aligned with either of the conveyor lines 24 and 30, a transmission assembly 102 is disengaged. Instead, the engagement of the transmission assembly 102 occurs only when there is alignment of the turn table with the conveyor lines.

In operation, the pallet assembly 40 carry the work pieces 42 along the conveyor lines where various operations can be performed along the work pieces 42 in the desired fashion. Since the work piece 42 is at a relatively low position, (see FIG. 2) awkward and/or elevated assembly by the worker is avoided. Furthermore, since the work piece 42 is spaced laterally outwardly from the conveyor lines, the possibility of injury to the worker is reduced since the worker is spaced away from the moving components of the conveyor line.

As the pallet assemblies 40 are conveyed along the conveyor line 24 and onto the turn table 70. Once the pallet assembly 40 is positioned on the turn table assembly 70, the turn table motor 80 is activated by the control system 100 which rotates the turn table 70 one hundred and eighty degrees (180°). Following completion of the turn table rotation, the pallet assembly 40 is then aligned with the second conveyor line 30. Simultaneously, the transmission assembly 102 between the second conveyor line 30 and the turn table conveyor section 102 is engaged thereby rotatably driving the turn table rollers 88 and 90 and moving the pallet assembly 40 off of the turn table assembly 70 and onto the second conveyor 30.

Appropriate and conventional limit switches together with selectively actuated stops are employed not only to activate the turn table motor 80, but also to maintain the pallet assemblies 40 on the turn table assembly 70 during rotation of the turn table assembly 70.

From the forging, it can be seen that the present invention provides an improved conveyor system for an assembly line which not only renders the entire conveyor system more compact then the previously known devices, it also renders the actual assembly safer and easier for the workmen.

Having described my invention, however, many modifications thereto will become apparent to those skilled in the art to which it pertains without deviation from the spirit of the invention as defined by the scope of the appended claims.

I claim:

1. A conveyor system comprising:
   a frame having a first elongated rail and a second elongated rail, said rails being spaced apart from each other,
   a plurality of first rollers,
   means for rotatably mounting said first rollers to said first rail at longitudinally spaced positions therealong so that said first rollers define a first conveyor line,
   a plurality of second rollers,
   means for rotatably mounting said second rollers to said second rail at longitudinally spaced positions therealong so that said second rollers define a second conveyor line,
   a pallet having means for supporting a work piece, said pallet adapted to be supported by either said first rollers or said second rollers,
   means for transferring said pallet from said first conveyor line to said second conveyor line comprising a turntable, said turntable having a first set of a plurality of longitudinally spaced rollers defining a conveyor line section, means for rotating said turntable between a first position in which said conveyor line section is aligned with said first conveyor line and a second position in which said conveyor line section is aligned with said second conveyor line;
   wherein said transferring means further comprises a second set of a plurality of longitudinally spaced rollers on said turntable, said second set defining a second conveyor section spaced apart and parallel to said first mentioned conveyor section by a distance substantially the same as said rails so that when said first mentioned conveyor section is aligned with said first conveyor line, said second conveyor section is aligned with said second conveyor line, and vice versa.

2. The invention as defined in claim 1 and comprising means for rotatably driving at least one of said first rollers.

3. The invention as defined in claim 1 and comprising means for rotatably driving at least one of said second rollers in a direction opposite from said at least one first roller.

4. The invention as defined in claim 2 and comprising means for rotatably driving at least one roller in said conveyor section.

5. The invention as defined in claim 4 wherein said means for rotatably driving said at least one roller in said conveyor section comprises means for rotatably drivingly connecting said rotatable driving means to said at least one roller in said conveyor section.

6. The invention as defined in claim 5 wherein said rotatably drivingly connecting means comprises a transmission assembly having a first portion mounted at one end of said first conveyor line and a second section mounted to said turntable at one end of said conveyor section, said portions of said transmission assembly engaging each other only when said first conveyor line is aligned with said first conveyor section.

7. The invention as defined in claim 6 wherein said portions of said transmission assembly each comprises a gear, said gears being in mesh with each other only when said first conveyor line is aligned with said first conveyor section.

8. The invention as defined in claim 1 wherein said pallet further comprises a runner having a bottom surface adapted to be supported by either of said rollers, an upright member secured to said runner and having a top surface, wherein said work piece supporting means comprises an elongated member having one end secured to and extending laterally outwardly from said upright member of said pallet, the work piece being mounted to a free end of the member.

9. The invention as defined in claim 8 and further comprising an upper guide rail mounted to said frame above said conveyor line, said upper guide rail being spaced apart and parallel to said conveyor line, and said pallet further comprising an upper guide roller rotatably mounted to said upright member adjacent said top surface of said pallet at a position so that said upper guide roller engages said upper guide rail.

10. The invention as defined in claim 9 and further comprising a pair of spaced apart lower guide rails mounted to said frame above said conveyor line, said lower guide rails being spaced apart and parallel to said conveyor line and said pallet further comprising a lower guide roller rotatably mounted to said runner adjacent said bottom surface of said pallet at a position so that said lower guide roller is sandwiched between said lower guide rails.

11. A conveyor system comprising:

a frame having a first elongated rail and a second elongated rail, said rails being spaced apart from each other, a plurality of first rollers, means for rotatably mounting said first rollers to said first rail at longitudinally spaced positions there along so that said first rollers define a first conveyor line, a plurality of second rollers, means for rotatably mounting said second rollers to said second rail at longitudinally spaced positions there along so that said second rollers define a second conveyor line, a pallet having means for supporting a work piece, said pallet adapted to be supported by either said first rollers or said second rollers, means for transferring said pallet from said first conveyor line to said second conveyor line comprising a turntable, said turntable having a first set of a plurality of longitudinally spaced rollers defining a conveyor line section, means for rotating said turntable between a first position in which said conveyor line section is aligned with said first conveyor line and a second position in which said conveyor line section is aligned with said second conveyor line, wherein said pallet further comprises a runner having a bottom surface adapted to be supported by either of said rollers, an upright member secured to said runner and having a top surface, wherein said work piece supporting means comprises an elongated member having one end secured to and extending laterally outwardly from said upright member of said pallet, the work piece being mounted to a free end of the member, and an upper guide rail mounted to said frame above said conveyor line, said upper guide rail being spaced apart and parallel to said conveyor line, and said pallet further comprising an upper guide roller rotatably mounted to said upright member adjacent said top surface of said pallet at a position so that said upper guide roller engages said upper guide rail.

12. The invention as defined in claim 11 and further comprising a pair of spaced apart lower guide rails mounted to said frame above said conveyor line, said lower guide rails being spaced apart and parallel to said conveyor line, and said pallet further comprising a lower guide roller rotatably mounted to said runner adjacent said bottom surface of said pallet at a position so that said lower guide roller is sandwiched between said lower guide rails.

* * * * *